United States Patent [19]

Sakaguchi et al.

[11] Patent Number: 4,828,197
[45] Date of Patent: * May 9, 1989

[54] METHOD AND DEVICE FOR WINDING MAGNETIC TAPE USING MAGNETIC ALIGNMENT

[75] Inventors: Masaaki Sakaguchi; Keisuke Wakatsuki, both of Kanagawa, Japan

[73] Assignee: Fuji Photo Film Co., Ltd., Kanagawa, Japan

[*] Notice: The portion of the term of this patent subsequent to Nov. 8, 2005 has been disclaimed.

[21] Appl. No.: 33,696

[22] Filed: Apr. 3, 1987

[30] Foreign Application Priority Data

Apr. 3, 1986 [JP] Japan .................................. 61-75553

[51] Int. Cl.$^4$ ...................... B65H 27/00; G11B 23/00
[52] U.S. Cl. .................................. 242/67.1 R; 242/76
[58] Field of Search ...................... 242/67.1 R, 76, 78, 242/78.1, 179, 186; 226/93–97; 360/66

[56] References Cited

U.S. PATENT DOCUMENTS 4,013,241  3/1977  Gray .............................. 242/84.52 B
4,343,441  8/1982  Graham .............................. 242/68.1

Primary Examiner—Stuart S. Levy
Assistant Examiner—Steven M. duBois
Attorney, Agent, or Firm—Sughrue, Mion, Zinn, Macpeak & Seas

[57] ABSTRACT

A tape winding method and apparatus in which two sets of magnets disposed at different places around the take-up reel of a magnetic tape apply a magnetic field in the width direction of the tape at one position and in the thickness direction at another position. Thereby, the tape is both radially compressed and evened to one side.

5 Claims, 5 Drawing Sheets

METHOD AND DEVICE FOR WINDING MAGNETIC TAPE USING MAGNETIC ALIGNMENT

BACKGROUND OF THE INVENTION

1. Field of the Invention

The present invention relates to a method and a device for winding a magnetic tape, such as winding a magnetic tape of prescribed length from a source roll of a magnetic tape to a small tape winding body, rewinding a magnetic tape from a tape winding body to another tape winding body, winding a magnetic tape of large width for a source "roll", and winding a magnetic tape of large width to a plurality of tape winding bodies while slitting the tape.

2. Background of the Invention

A process of manufacturing a magnetic tape such as an audio cassette tape, a video cassette tape, a memory tape and a broadcasting video tape includes a step of winding a magnetic tape of prescribed length from a source roll of a large-length tape to a small tape winding body such as a reel and a hub, a step of rewinding a magnetic tape from a tape winding body to another tape winding body, a step of winding a magnetic tape of large width as a source tape, a step of winding a magnetic tape slit from another magnetic tape, and so forth. When the magnetic tape is wound on the tape winding body in the process of the winding or the rewinding, the tape may vibrate in the direction of the thickness of the tape and this vibration can fluctuate due to the physical properties of the magnetic tape and those of the tape winding body so that each side edge of the tape wound on the winding body is unneatly overlaid on itself. The higher that the speed of the winding is, the more unneatly the side edge is overlaid on itself.

A magnetic tape whose side edge is unneatly overlaid on itself as described above has problems that the external appearance of the wound tape housed as a commercial product in a magnetic tape cassette is bad. Furthermore, the side edge is likely to be damaged to result in various troubles such as the deterioration of the electromagnetic converting properties of the tape. The unneat overlaying is a serious drawback, particularly for a magnetic video tape for high-density recording, because an audio signal or a tuning singal is recorded near the side edge of the tape. For these reasons, in a conventional process of manufacturing a magnetic tape, the wound states of all magnetic tapes are visually inspected or the like after a winding process or a rewinding process. Since the inspection takes much time and money, the inspection is a major disadvantage in the magnetic tape manufacturing process.

Conventional systems, which are shown in FIGS. 1 and 2 and which accomplish what is called neat winding, have been adopted to wind a magnetic tape of low neat-winding yield in order to improve the wound state of the tape to reduce the necessity of its inspection. FIGS. 1 and 2 show perspective schematic views of tape winding bodies 2 and the vicinity thereof.

In the conventional system shown in FIG. 1, an endless flexible belt 11 made of rubber, polyimide or the like and rotatably supported by rollers 12, 13 and 14 is revolved together with the magnetic tape T and elastically pushes the magnetic side of the tape under relatively high pressure in the radial direction of the tape winding body 2 to neatly wind the tape.

In the conventional system shown in FIG. 2, a belt 15 made of a relatively soft nonwoven fabric or the like is provided between one flange of the tape winding body 2 and one side edge of the magnetic tape T to push the side edge of the tape T under relatively high pressure while the belt is supported by a roller 17 or the like and wound at a low constant speed from a belt send-out member 16 to a belt winding member 18 so as to neatly wind the tape.

However, since the belts 11 and 15 are placed in direct contact with the magnetic tape T in the above-mentioned systems, there are various problems that the magnetic layer of the tape is worn or the fibers of the nonwoven fabric come off to locally hinder recording on the tape, inappropriate pressure acts to deform the tape or damage its side edge, and so forth. For that reason, the systems do not function properly. In addition, since the wear and tear of the neat winding systems are large, they have disadvantages with regard to their cost and maintenance as well. The constitution of each of the systems needs to be such that the tape winding body 2 is moved between at least a working position and a non-working position when it is replaced. The constitution makes a magnetic tape winding device complicated and renders it relatively time-consuming to replace the tape winding body 2. The period of time required for the movement of the tape winding body 2 hinders the enhancement of productivity.

Two systems for winding a magnetic tape for a cassette are used today. One of them is an open winding system in which the tape is neatly wound and then inserted into the cassette as so to be a finished product. The other is an in-cassette winding system which is also called C-O winding system or V-O winding system and in which the tape is wound at the final stage of assembly of the cassette.

As for the in-cassette winding system, as shown in FIG. 3, the cassette 23 without the magnetic tape is first assembled, an outgoing tape winding body 2 and an incoming tape winding body 3 which are coupled to each other by a leading tape 10 are inserted into the cassette 23 and screws are tightened so as to provide an unfinished product generally called V-O, C-O or the like. In the unfinished product, the leading tape 10 is partly pulled out by an in-cassette winder and cut in half. The front end of the magnetic tape T is spliced to one cut-off end of the leading tape 10 whose other cut-off end is held by a suction member 22. The tape winding body 2 having the leading tape spliced to the magnetic tape is rotated to wind the magnetic tape on the body 2 by a prescribed length. The magnetic tape T is then cut off. The rear end of the magnetic tape T wound on the winding body 2 is then spliced to the other cut-off end of the leading tape 10, thus finishing the product. Since the wound state of the magnetic tape T entirely depends on the physical properties of the tape T and the accuracy of the assembly of the cassette 23, the wound state cannot be well controlled. For that reason, the yield of well-wound magnetic tapes is low. In order to increase the yield, a roller 24, shown in FIG. 4, having an upper and a lower flanges 25 has been provided on a trial basis to apply a force to the magnetic tape in the direction of its width to push the tape T sideward. However, after all, no means was available to improve the wound state of the magnetic tape.

Although the conventional winding systems shown in FIGS. 1, 2, 3 and 4 are for neatly winding a magnetic tape after the tape is made as source tape or other tape of smaller width, it has also been desired to neatly wind another magnetic tape having a large width and not yet made into a source tape without using a member such as a flange which restricts the side edge of the tape.

Meanwhile, a magnetic tape winding device was recently proposed in the Japanese Patent Application (OPI) No. 51642/86 (the term "OPI" as used herein means an "unexamined published application"). In the device illustrated in FIG. 5, a winding drive shaft 30 is removably coupled to the winding hub 41 of a winding reel 42 comprising the hub and a flange 42. At least one magnet 31 is provided to face the wound side edge of a magnetic tape across the flange 42 while the tape is wound on the reel 40 so as to improve the wound state of the tape. However, the magnet 31 provided around the shaft 30 has a problem that the wound state of the tape is worse at its central portion near the winding hub 41 than at the peripheral portion of the tape. That is because the form of the magnet 31 is limited by the shaft 30. The magnet 31 is made annular so that the directions of the lines of magnetic force thereof are nonuniformly distributed near the central portion of the winding reel 40 due to the hollow central portion of the magnet. The magnetic flux density near the center of the reel 40 is so low that the magnetic force which pulls the magnetic tape T toward the flange 42 is unstable and weak at the initial stage of the winding of the tape. In addition, if the winding reel 40 has no flange (flangeless type), the magnetic tape winding device shown in FIG. 5 can not be applied to the winding reel.

SUMMARY OF THE INVENTION

The present invention was made in consideration of the above-mentioned circumstances.

Accordingly, it is an object of the present invention to provide both a method and a device for neatly winding a magnetic tape on a tape winding body even if the physical properties of the tape are irregular.

It is another object of the present invention to provide a method and a device for winding a magnetic tape without complicating the device and degrading the quality of the tape as in the above-described neat winding systems so as to improve the working properties of the process of the winding of the tape.

It is still another object of the present invention to provide a method and a device for winding a magnetic tape to greatly improve the wound state of the tape even if the tape is wound with the in-cassette winding system or has a large width as before being made into a source tape or is an already cut-off tape.

In order to obtain the above objects, the several U.S. patent applications are proposed. For example, an application (Ser. No. 010516, filed on Feb. 3, 1987) proposes a magnetic tape winding device in which a magnetic field is generated in a direction of a thickness of the magnetic tape, and another application (Ser. No. 008,494, filed on Jan. 29, 1987) discloses a magnetic tape winding device in which a magnetic field is generated in an inclined direction of the thickness of the magnetic tape.

The present invention is a method and apparatus for neatly winding magnetic tape on a reel. The magnetic tape is taken up on the reel while a magnetic field substantially in a direction of a width of the magnetic tape and a magnetic field substantially in a direction of a thickness of the magnetic tape are applied at different spots at least in the vicinity of the tape winding body. The apparatus comprises at least one first magnet for generating a magnetic field substantially in a direction of a width of the magnetic tape, and at least one second magnet for generating a magnetic field substantially in a direction of a thickness of the magnetic tape, the first and second magnets being disposed at unevenly distributed positions at least in the vicinity of the tape winding body.

DETAILED DESCRIPTION OF THE PREFERRED EMBODIMENTS

An embodiment of the apparatus by which the method according to the invention is realized will be described in detail hereunder.

Figure 1:
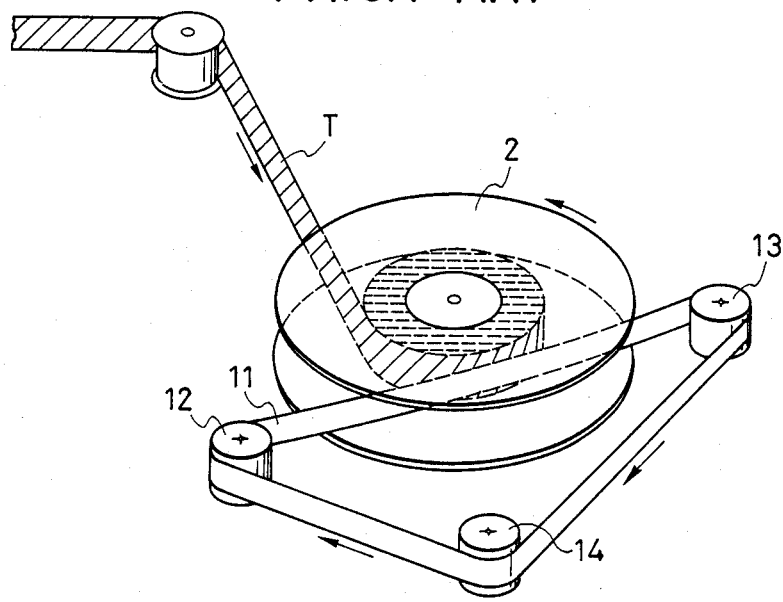
FIGS. 1 and 2 are schematic perspective views respectively showing a part of two conventional take-up apparatus.
Figure 2:
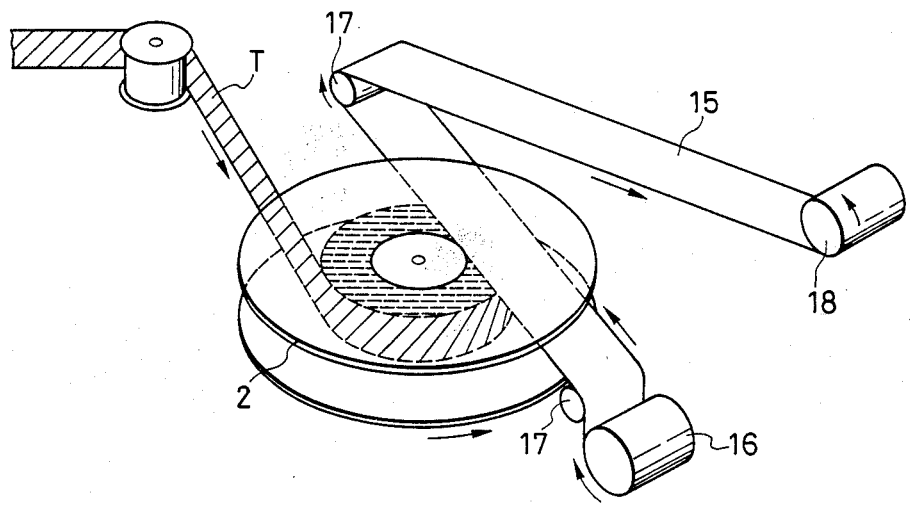
Figure 3:
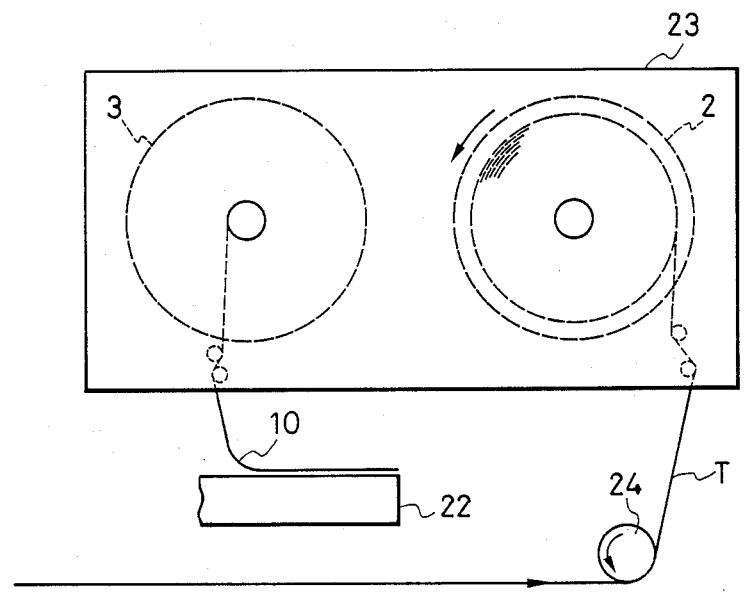
FIG. 3 is a schematic plan view of the conventional take-up apparatus in accordance with in-cassette take-up method.
Figure 4:
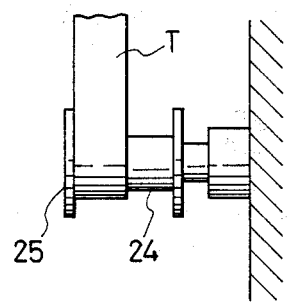
FIG. 4 is an enlarged side view showing a main part of the conventional take-up apparatus of FIG. 3.
Figure 5:
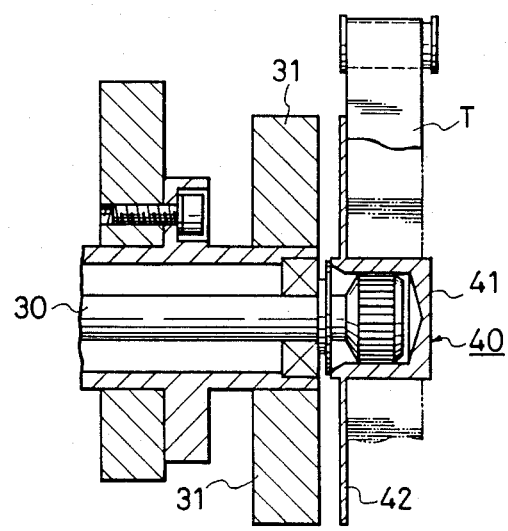
FIG. 5 is a sectional view showing a part of another take-up apparatus.
Figure 6:
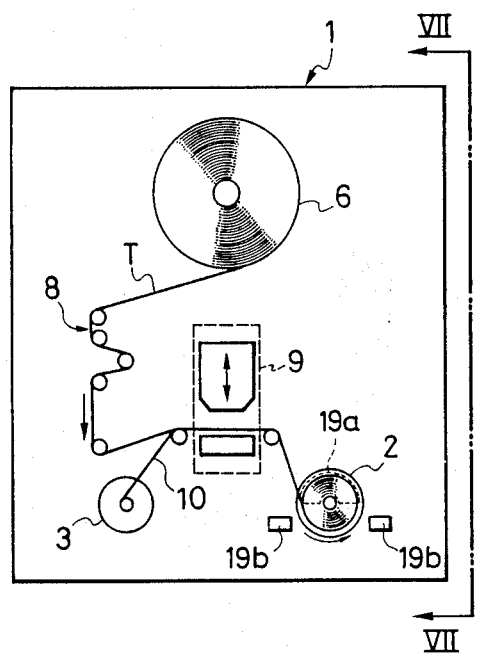
FIG. 6 is a schematic front view of an embodiment of the take-up apparatus in accordance with the present invention.
Figure 7:
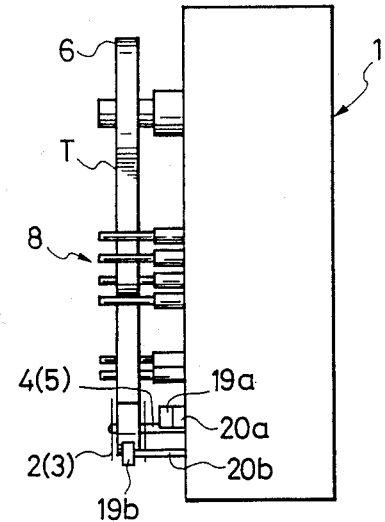
FIG. 7 is a schematic side view of the embodiment of FIG. 6.

FIG. 6 is a schematic front view of an embodiment of the magnetic tape take-up apparatus according to the invention, and FIG. 7 is a side view along the line VII—VII of FIG. 6. For example, the take-up apparatus 1 is used in a method in which a magnetic tape T is wound on a pair of tape winding bodies 2 and 3 (hereinafter referred to as "tape reels") to be incorporated in a video tape cassette.

In the following, the operation of the take-up apparatus 1 is described in brief.

At first, the tape reels 2 and 3 are connected by a leader tape 10 having a predetermined length (half of which is illustrated in FIG. 6). After the tape reels 2 and 3 are respectively mounted onto rotary shafts 4 and 5 to be rotationally driven in the take-up apparatus, the leader tape 10 is cut off in the middle. The cut end of one part of the leader tape 10 connected to the right tape reel 2 is spliced with a bonding tape or the like to a forward end of a coiled raw magnetic tape 6 mounted in advance. A predetermined length of the magnetic tape T, pulled initially by the leader tape 10, is taken on the right tape reel 2 and is then cut off. Thereafter the cut end of the magnetic tape T wound on the right tape reel 2 is spliced to the other cut end of the other part of the leader tape 10 connected to the left tape reel 3.

The cutting of the leader tape 10 and the magnetic tape T and the splicing between the leader tape 10 and the magnetic tape T are carried out by cutting and bonding means 9 provided with a tape end holding member, a cutter, a bonding tape, and so on. The magnetic tape T fed from the raw tape 6 is wound on the right tape reel 2 through a transport system 8 comprising guide pins and guide rollers. The cutting and bonding means 9 are not shown in FIG. 7.

Figure 8:
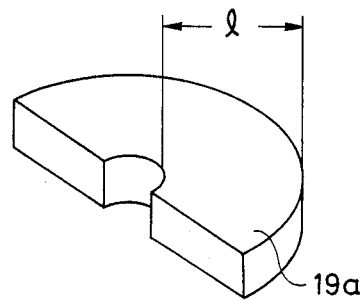
FIG. 8 is an enlarged perspective view of the magnet depicted in FIG. 7.

Although the above description is applicable to the conventional apparatus, the apparatus according to the invention is featured in the mount portion of the right tape reel 2 which winds the magnetic tape T. Specifically, it is featured in the fact that a pair of permanent magnets 19b are provided so as to put a part of the take-up reel 2 therebetween along the rotation plane of the tape reel 2 for taking up the magnetic tape T. That is, the magnets 19b are located on a line spaced apart from the rotary axis of the take-up reel 2. Furthermore, a half-moon permanent magnet 19a as shown in FIG. 8 is provided so as to semicircularly surround the shaft 4.

Figure 9:
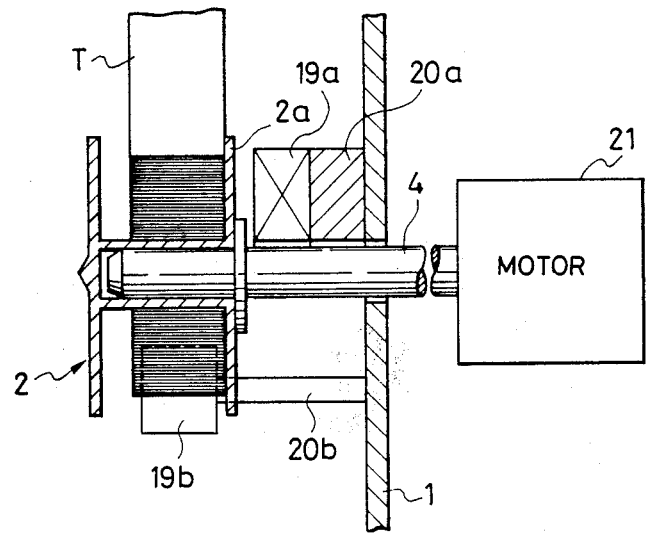
FIG. 9 is an enlarged sectional view taken along the reel shaft depicted in FIG. 7.

The pair of permanent magnets 19b are attached to the apparatus body, for example, through supports 20b and are disposed such that different poles of the respective permanent magnets 19b are made to be in opposition to each other to thereby apply a magnetic field onto the magnetic tape T substantially along a plane perpendicularly intersecting the rotary shaft 4 (that is, a magnetic field in the direction transverse to a width of the tape T and a large fraction of which is along the thickness direction of the tape T). On the other hand, as shown in FIG. 9, the half-moon magnet 19a is attached to the apparatus body, for example, through a support 20a and is disposed in the close vicinity of a flange 2a of the tape reel 2 to thereby apply to the magnetic tape T a magnetic field substantially in the axial direction of the rotary shaft 4 (that is, a magnetic field in the direction of the width of the tape). Preferably, the radial length l of the permanent magnet 19a is selected to be larger than the maximum radius of winding of the tape wound on the take-up reel 2.

The pair of magnets 19b and the half-moon magnet 19a for generating different magnetic fields are nonsymmetrically disposed at places where the magnetic fields do not interfere with each other or the interference therebetween is minimized. Each of the permanent magnets 19a and 19b may be fixed at a predetermined place or may be movably mounted so as to be capable of adjusting the magnetic force applied to the magnetic tape T and its place.

The rotary shaft 4 is linked to driving means 21, such as an electric motor or the like so as to be rotatably driven by the driving means 21.

In the case where the magnetic tape T is taken up at the tape-up portion arranged as described above, an attractive force in the direction of the tape thickness is caused by the influence of the magnetic flux between the pair of magnets 19b linearly extending from the north pole to the south pole of the respective permanent magnets 19b. This attractive force acts on the magnetic tape T so that the magnetic tape layers are attracted to each other in the direction of the tape thickness to thereby increase a frictional force between the magnetic tape layers. On the other hand, the magnetic tape T is attracted toward the half-moon permanent magnet 19a owing to the influence of the magnetic flux produced by the permanent magnet 19a and wound while being caused to touch the magnet-side flange 2a at its one edge. As a result, both the two forces in the direction of tape thickness and in the direction of tape width respectively are applied to the magnetic tape T without mechanical contact.

Furthermore, the two forces produced by the unevenly distributed magnets alternately and repeatedly act on the magnetic tape T as the take-up tape reel 2 rotates. Accordingly, the magnetic tape T can be wound in a very desirable take-up condition and the take-up condition can be maintained. Particularly, when the magnetic tape is rolled in at a high speed, the air is inevitably rolled in together with the magnetic tape T to thereby form an air layer between a tape part which is currently wound and a tape part which has been wound. As a result, the part of the magnetic tape T which is currently being wound is apt to move in the direction of tape width. Accordingly, the tape edge can be easily turned up by the influence of magnetic flux produced by the unevenly distributed permanent magnets 19a and 19b. The effect is very advantageous.

Although the aforementioned embodiment shows the case where a pair of permanent magnets 19b with their respective different poles placed in opposition to each other are used for applying to the magnetic tape T a magnetic field along a plane perpendicularly intersecting the rotary shaft 4 (that is, a magnetic field in the direction of the tape thickness) may otherwise be employed. The present invention is not limited to the specific embodiment and may be arranged as shown in FIG. 10.

Figure 10:
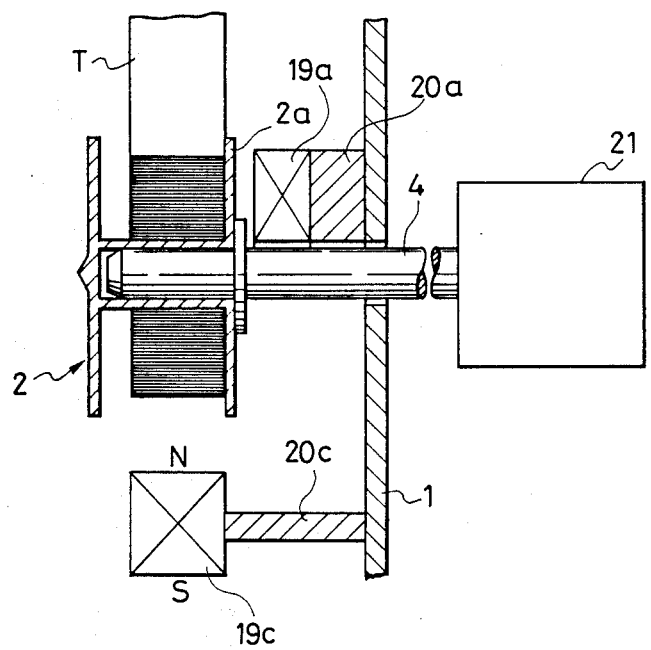
FIG. 10 is an enlarged sectional view showing a part of another embodiment.

FIG. 10 is a sectional view showing a part similar to that shown in FIG. 9. FIG. 10 is identical to FIG. 9 in location and configuration of the half-moon permanent magnet 19a and its support 20a but is different from FIG. 9 in that a permanent magnet 19c is secured by a support 20c, as depicted in FIG. 10, in a location on a radius of the reel 2. In FIG. 10, the permanent magnet 19c has opposite poles disposed along a radial direction of the tape reel so that, for example, the north pole is in opposition to the tape surface. Accordingly, a magnetic field substantially in the direction of the tape thickness can be produced by the permanent magnet 19c in the same manner as described in the foregoing embodiment. Although the drawing shows the case where one permanent magnet 19c is used, the invention is applicable to the case where a plurality of permanent magnets similar to the permanent magnet 19c are disposed along the circumference of the reel.

It is a matter of course that the shape of the permanent magnet 19a used in each of the embodiments is not limited to the half-moon shape as shown in FIG. 8, but various modifications in the shape thereof may be made.

Although each of the embodiments shows the case where a permanent magnet is used as the respective magnet, it is to be understood that the invention is not limited to the specific embodiments but an electromagnet may be used as the respective magnet. In the case where an electromagnet is used, the magnetic flux produced by the electromagnet can be desiredly changed corresponding to the change of the current caused to flow therein.

Although the description shows the case where the magnets used in the aforementioned take-up apparatus 1 are provided only in the vicinity of the rotary shaft 4, the invention is not limited thereto. For example, further magnets may be provided in the vicinity of the path system 8 forming the traveling path of the magnetic tape T. In this case, magnetic flux can be applied to the magnetic tape T in both the directions of tape width and tape thickness to thereby prevent unexpected vibration of the magnetic tape T for the purpose of stabilization in running property of the tape.

The invention is not limited to the aforementioned embodiments but various modifications may be made. For example, the invention is applicable to the case where a wide raw tape is divided into a plurality of raw tapes usable as manufactured articles to be wound on the tape reels. Furthermore, the invention is applicable to another take-up apparatus, for example, an in-cassette type take-up apparatus.

The term "magnet" used in this specification is not limited to "permanent magnet" or "electromagnet" as described above, and generally represents "magnetic field generating means", for example, inclusive of the concept of a 'solenoid'.

As described above in detail, according to the invention, magnetic forces of at least two directions, for example, the direction of tape thickness and the direction of tape width, can be applied to the magnetic tape without contact by use of magnetic fields produced by a plurality of magnets which are unevenly distributed with respect to a tape reel. Accordingly, because stable magnetic forces act on the wide area from the center of the tape reel to the outer circumference thereof, the tape edge can be easily turned up as well as the magnetic tape can be tightly wound by a large friction force acting thereon. Consequently, the appearance of the thus wound magnetic tape becomes desirable, and the desirable condition can be maintained.

Accordingly, it is possible to improve both the quality of magnetic tapes and the manufacturing efficiency of take-up process. Furthermore, the take-up apparatus according to the invention has a remarkable effect that means for adjusting tape winding conditions are not complicated. Particularly, when the invention is applied to the take-up apparatus using in-cassette type take-up means, it is possible to provide a rapid progress of method and apparatus.

What is claimed is:

1. A method of winding a magnetic tape on a tape winding body, comprising the steps of:
   rotating with respect to a support a tape winding body to which is attached a magnetic tape, thereby winding said tape on said tape winding body; and
   applying a spatially varying magnetic field to said rotating tape winding body, said spatially varying magnetic field being substantially in a first direction of a width of said wound tape at a first portion of said tape winding body and being substantially in a direction of thickness of said tape at a second portion of said tape winding body spatially separated from said first portion, whereby stable magnetic forces act on a wide area from the center of the tape winding body to the outer circumference thereof, the tape edges are readily aligned, and the magnetic tape is tightly wound by the forces acting thereon to enhance the appearance of the thus wound magnetic tape and the desirable conditions are readily maintained.

2. A magnetic tape winding apparatus, comprising:
   a tape winding body;
   a magnetic tape attached to said tape winding body;
   means for rotating said tape winding body with respect to a support, whereby said magnetic tape is wound on said tape winding body;
   first magnetic means for generating a first magnetic field substantially in a first direction of a width of said wound tape at a first position with respect to said support; and
   second magnetic means for generating a second magnetic field substantially in a direction of width of said tape at a second position spatially separated from said first position with respect to said support.

3. A magnetic tape winding apparatus as recited in claim 2, wherein said first and second magnetic means comprise different magnets unevenly distributed with respect to said support.

4. A magnetic tape winding apparatus as recited in claim 3, wherein said first magnetic means comprises a magnet shaped in a partial annulus and disposed to partially surround a shaft of said rotating means attached to said tape winding body and wherein said second magnetic means comprises two magnets having opposite poles facing each other such that a straight line passing between said two magnets passes through said tape winding body along a plane perpendicular to said shaft.

5. A magnetic tape winding apparatus as recited in claim 3, wherein said first magnetic means comprises a magnet shaped in a partial annulus and disposed to partially surround a shaft of said rotating means attached to said tape winding body and wherein said second magnetic means comprises a magnet having a pole facing said shaft along a line passing through said tape winding body in a plane perpendicular to said shaft.

* * * * *